United States Patent
Otsuhata

(10) Patent No.: US 11,782,578 B2
(45) Date of Patent: Oct. 10, 2023

(54) INFORMATION PROCESSING DEVICE, INFORMATION PROCESSING METHOD, AND NON-TRANSITORY STORAGE MEDIUM FOR CONFIGURING MENU SCREEN CONFIGURATION OF A CONNECTED DEVICE

(71) Applicant: JVCKENWOOD Corporation, Yokohama (JP)

(72) Inventor: Hiroshi Otsuhata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/539,244

(22) Filed: Dec. 1, 2021

(65) Prior Publication Data

US 2022/0091705 A1    Mar. 24, 2022

Related U.S. Application Data

(63) Continuation of application No. PCT/JP2020/021249, filed on May 28, 2020.

(30) Foreign Application Priority Data

Jun. 20, 2019  (JP) ................................ 2019-114291

(51) Int. Cl.
   *G06F 3/0482*         (2013.01)
(52) U.S. Cl.
   CPC ................... *G06F 3/0482* (2013.01)
(58) Field of Classification Search
   CPC .. G06F 3/048; G06F 3/0482; H04M 1/72406; H04M 1/72448; H04M 1/72463;

(Continued)

(56) References Cited

U.S. PATENT DOCUMENTS

| 2008/0141148 A1* | 6/2008 | Ogita | H04N 1/00244 |
| | | | 715/762 |
| 2009/0064315 A1* | 3/2009 | Hong | H04L 63/0492 |
| | | | 726/17 |

(Continued)

FOREIGN PATENT DOCUMENTS

| JP | 2005-018165 | 1/2005 |
| JP | 2017-11517 | 1/2017 |

OTHER PUBLICATIONS

International Search Report and Written Opinion for International Application No. PCT/JP2020/021249 dated Jul. 7, 2020, 8 pages.

*Primary Examiner* — Dino Kujundzic
(74) *Attorney, Agent, or Firm* — AMIN, TUROCY & WATSON, LLP

(57) ABSTRACT

An information processing device includes an acquiring unit configured to, when an electronic device is connected, acquire a menu screen configuration information which is stored in the electronic device and which includes predetermined setting items; a generating unit configured to change the acquired menu screen configuration information based on at least one setting item selected according to the connected electronic device from among multiple selectable setting items; and a storage controller configured to store the menu screen configuration information, which has been changed by the generating unit, in the electronic device, wherein when at least one advance setting item is selected in advance from among the multiple selectable setting items, the generating unit is further configured to change the acquired menu screen configuration information based on the at least one advance setting item.

5 Claims, 14 Drawing Sheets

(58) Field of Classification Search
CPC ..... H04M 1/724631; H04M 1/724634; H04M 1/72469
See application file for complete search history.

(56) References Cited

U.S. PATENT DOCUMENTS

2013/0159917 A1\* 6/2013 Loebach ............... G06F 3/0488
715/778
2018/0173543 A1 6/2018 Ukegawa \* cited by examiner FIG.2
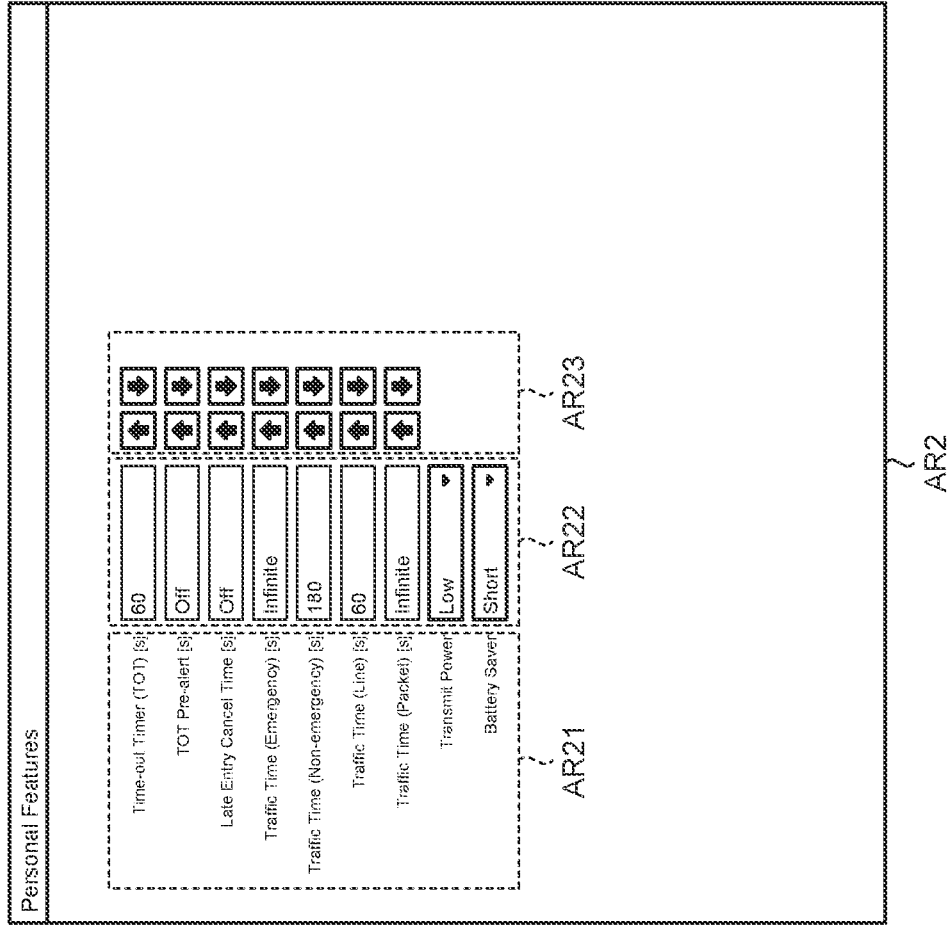
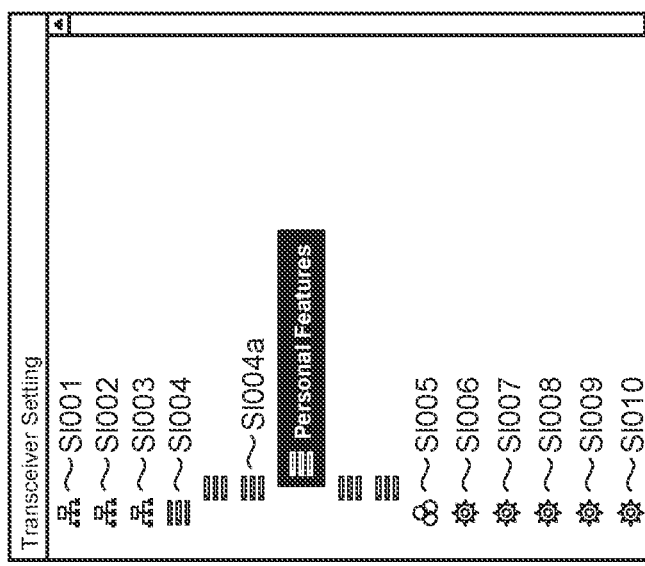

IM3

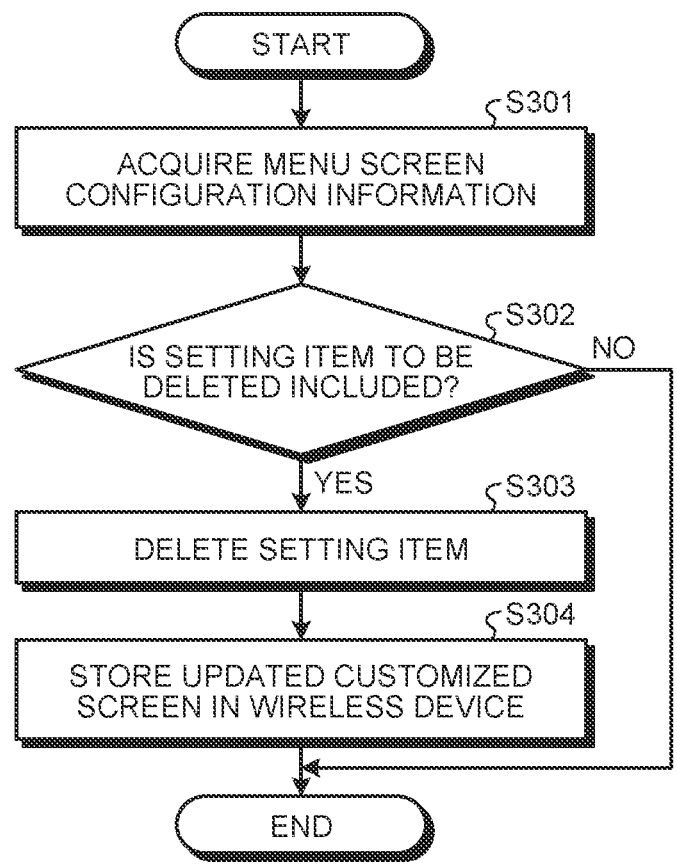

INFORMATION PROCESSING DEVICE, INFORMATION PROCESSING METHOD, AND NON-TRANSITORY STORAGE MEDIUM FOR CONFIGURING MENU SCREEN CONFIGURATION OF A CONNECTED DEVICE

CROSS-REFERENCE TO RELATED APPLICATIONS

This application is a Continuation of PCT International Application No. PCT/JP2020/021249 filed on May 28, 2020 which claims the benefit of priority from Japanese Patent Application No. 2019-114291 filed on Jun. 20, 2019, the entire contents of both of which are incorporated herein by reference.

FIELD

The present application relates to an information processing device, an information processing method, and a non-transitory storage medium.

BACKGROUND

A graphical user interface (GUI) is known that, in order to enable to have various settings with respect to an electronic device, displays objects such as buttons and text boxes in a screen of a computer so that the user can perform operations easily.

An intended use of an electronic device may differ from user to user. In that regard, there is a technology for customizing configuration of setting items in a user-friendly manner. For example, in Japanese Patent Application Laid-open No. 2005-18165, a technology is disclosed about an application program that has a function of storing a configuration of a customized toolbar in a file, and a function of reading the configuration from the file and reconfiguring the toolbar.

Regarding the setting items, a large number of types are known. Hence, in order to configure a customized screen, the user needs to perform the setting by searching for his/her required setting items from among a large number of the setting items. Moreover, also at a time of updating the setting items, the user needs to perform the setting by searching for the required setting items from among the large number of the setting items. In that regard, there is a demand for a method that enables to configure a customized screen in an easy way without requiring much time and efforts.

SUMMARY

An information processing device, an information processing method, and a non-transitory storage medium are disclosed According to one aspect, there is provided an information processing device comprising: an acquiring unit configured to, when an electronic device is connected, acquire a menu screen configuration information which is stored in the electronic device and which includes predetermined setting items; a generating unit configured to change the acquired menu screen configuration information based on at least one setting item selected according to the connected electronic device from among multiple selectable setting items; and a storage controller configured to store the menu screen configuration information, which has been changed by the generating unit, in the electronic device, wherein when at least one advance setting item is selected in advance from among the multiple selectable setting items, the generating unit is further configured to change the acquired menu screen configuration information based on the at least one advance setting item.

According to one aspect, there is provided an information processing method comprising: acquiring, when an electronic device is connected, a menu screen configuration information which is stored in the electronic device and which includes predetermined setting items; changing the acquired menu screen configuration information based on at least one setting item selected according to the connected electronic device from among multiple selectable setting items; and storing the changed menu screen configuration information in the electronic device, wherein when at least one advance setting item is selected in advance from among the multiple selectable setting items, further changing the acquired menu screen configuration information based on the at least one advance setting item.

According to one aspect, there is provided a non-transitory storage medium that stores a computer program that causes a computer to execute: acquiring, when an electronic device is connected, a menu screen configuration information which is stored in the electronic device and which includes predetermined setting items; changing the acquired menu screen configuration information based on at least one setting item selected according to the connected electronic device from among multiple selectable setting items; and storing the changed menu screen configuration information in the electronic device, wherein when at least one advance setting item is selected in advance from among the multiple selectable setting items, further changing the acquired menu screen configuration information based on the at least one advance setting item.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 2 is a diagram for explaining a commonly-used method for setting items in a wireless device;

FIG. 13 is a flowchart for explaining an exemplary flow of processes performed by the controller of the information processing device for deleting a setting item from the customized screen.

DETAILED DESCRIPTION OF THE PREFERRED EMBODIMENTS

Exemplary embodiments of the present application are described below in detail with reference to the accompanying drawings. However, the present application is not limited by the embodiments described below. Moreover, when a plurality of embodiments is described, it is also possible to use a combination of the embodiments.

Figure 1:
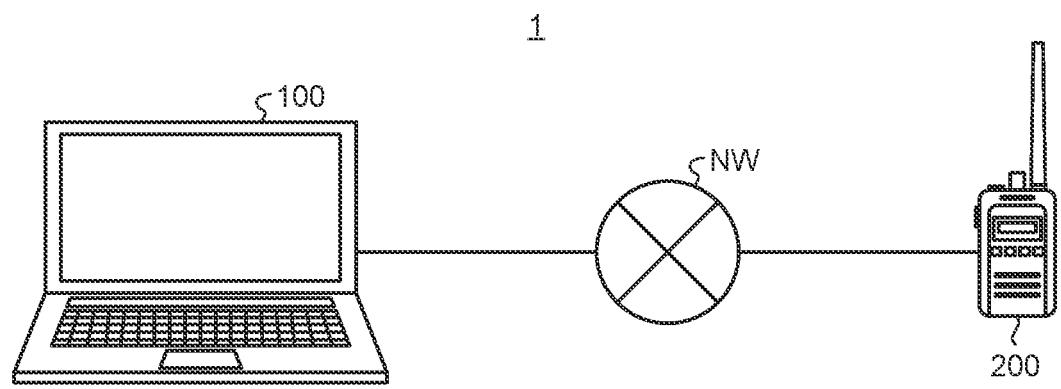
FIG. 1 is a diagram illustrating a configuration of an information processing system according to embodiments of the present application.

Explained below with reference to FIG. 1 is a configuration of an information processing system according to the embodiments of the present application. FIG. 1 is a diagram illustrating a configuration of the information processing system according to the embodiments of the present application.

As illustrated in FIG. 1, an information processing system 1 includes an information processing device 100 and a wireless device 200. The information processing device 100 and the wireless device 200 are connected to each other via a network NW in a wired manner or a wireless manner. When a connection between the information processing device 100 and the wireless device 200 is established, the information processing device 100 generates a customized screen configured by only required setting items from among various types of setting items of the wireless device 200.

The following explanation is given about a method by which the information processing device 100 customizes the setting items corresponding to the wireless device 200. However, the present application is not limited to that case. Alternatively, the present application is also applicable in a case of customizing the setting items for various types of electronic devices.

Explained below with reference to FIG. 2 is a commonly-used method for setting the setting items in the wireless device 200. FIG. 2 is a diagram for explaining a commonly-used method for setting the setting items in the wireless device 200.

A display screen IM1 is an example of a screen that is displayed in the information processing device 100 when the user is setting the setting items in the wireless device 200. The display screen IM1 includes an area AR1 and an area AR2.

In the area AR1, various setting items corresponding to the wireless device 200 are displayed. Thus, in the area AR1, "SI001" to "SI010" are displayed as the setting items. In FIG. 2, each of the setting items is illustrated in a conceptual form such as "SI001". However, in practice, a name of a specific setting item, such as the network name, is written. In the area AR1, the setting items are displayed in, for example, a hierarchic manner in a form of a tree display. More particularly, in a lower level of the setting item "SI004", for example, a setting item "SI004a" is present. Moreover, in the lower level of the setting item "SI004a", for example, a setting item "Personal Features" is present.

The area AR2 is used to display details of the setting item that is selected in the area AR1. With reference to FIG. 2, in the area AR2, it is indicated that the setting item "Personal Features" is selected in the area AR1. The area AR2 includes areas AR21, AR22, and AR23.

The area AR21 is used to display names of the detailed setting items for the setting item selected in the area AR1. With reference to FIG. 2, the following setting items are displayed: "Time-out Timer (TOT) [s]", "TOT Pre-alert [s]", "Late Entry Cancel Time [s]", "Traffic Time (Emergency) [s]", "Traffic Time (Non-Emergency) [s]", "Traffic Time (Line) [s]", "Traffic Time (Packet) [s]", "Transmit Power", and "Battery Saver".

The area AR22 is used to display setting values of the setting items. For example, the setting item "Time-out Timer (TOT) [s]" is set to "60 seconds".

The area AR23 is used to display buttons for changing the setting values of the setting items. The user can increase the setting value by pressing up-arrow button and reduce the setting value by pressing down-arrow button. Meanwhile, in the example illustrated in FIG. 2, regarding the setting items "Transmit Power" and "Battery Saver", a state thereof can be changed using buttons displayed in the area AR22.

As explained with reference to FIG. 2, in order to change the value of the setting item for the wireless device 200, the desired setting item needs to be searched from the area AR1 and then the value of the corresponding detailed setting item displayed in the area AR2 needs to be changed. If such a task is to be performed for a plurality of wireless devices 200, it requires a lot of time thereby resulting in an increase in a load on the user. In that regard, in the present application, a method is provided that enables changing the setting items for the wireless device 200 easily.

Figure 3:
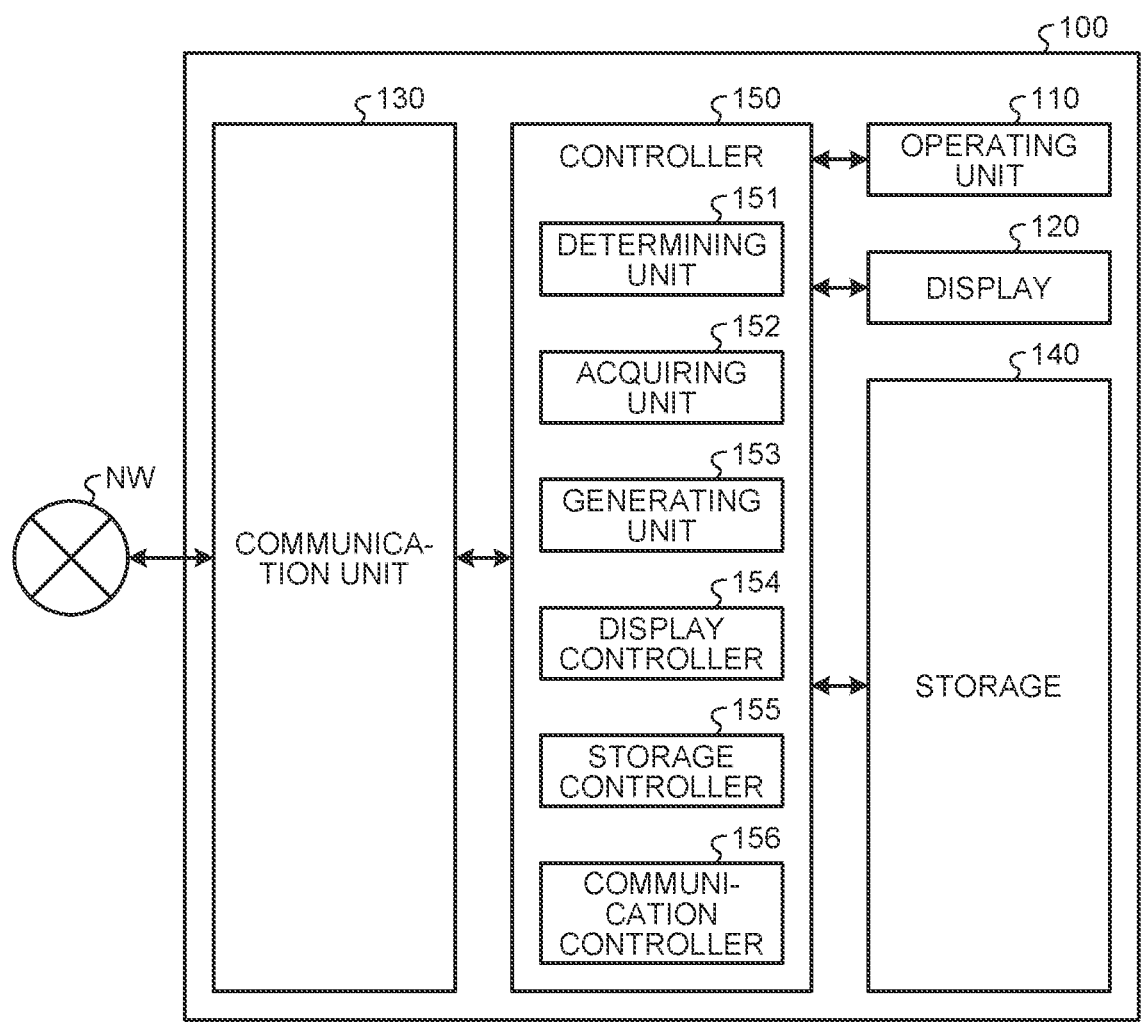
FIG. 3 is a block diagram illustrating an exemplary configuration of the information processing device according to the embodiments of the present application.

Explained below with reference to FIG. 3 is a configuration of the information processing device according to the embodiments of the present application. FIG. 3 is a block diagram illustrating an exemplary configuration of the information processing device according to the embodiments of the present application.

As illustrated in FIG. 3, the information processing device 100 includes an operating unit 110, a display 120, a communication unit 130, a storage 140, and a controller 150.

The operating unit 110 receives various operations from the user. For example, the operating unit 110 receives an operation for generating a customized screen configured by the setting items for the electronic device. Moreover, for example, the operating unit 110 receives an operation for setting or changing the values of the parameters of the setting items. Furthermore, for example, the operating unit 110 outputs, to the controller 150, an electrical signal for the received operation. The operating unit 110 is implemented with, for example, a keyboard, a mouse, or a touch-sensitive panel.

The display 120 displays a variety of information. For example, the display 120 displays a GUI that includes various setting items to be set for the electronic device. The display 120 is a display such as a liquid crystal display (LCD) or an organic electro-luminescence (EL) display. If the operating unit 110 is configured by a touch-sensitive panel, then the display 120 is integrated with the operating unit 110.

The communication unit 130 is implemented with, for example, a network interface card (NIC) or a communication circuit. The communication unit 130 is connected to a network NW (such as the Internet) in a wired manner or in a wireless manner. The communication unit 130 communicates information with other devices via the network NW. For example, the communication unit 130 communicates information with the wireless device 200.

The storage 140 is used to store a variety of information. For example, the storage 140 is implemented with a semiconductor memory device such as a random access memory (RAM) or a flash memory; or by a memory device such as a hard disk or an optical disk.

The controller 150 is implemented when, for example, a central processing unit (CPU) or a micro processing unit (MPU) executes a computer program, which is stored in a storage (not illustrated), (for example, a computer program related to the present application) by a random access memory (RAM) as the work area. Alternatively, the controller 150 can be a controller implemented by an integrated circuit such as an application specific integrated circuit (ASIC) or a field programmable gate array (FPGA). The controller 150 includes a determining unit 151, an acquiring unit 152, a generating unit 153, a display controller 154, a storage controller 155, and a communication controller 156.

The determining unit 151 performs determination about a variety of information. For example, the determining unit 151 determines whether or not the information processing device 100 has an electronic device connected thereto. For example, the determining unit 151 determines whether or not the information processing device 100 and the wireless device 200 are connected to each other.

The acquiring unit 152 acquires a variety of information. For example, the acquiring unit 152 acquires a variety of information from the electronic device connected to the information processing device 100. For example, from the electronic device connected to the information processing device 100, the acquiring unit 152 acquires a menu screen configuration information regarding a customized screen that includes the setting items which are only set in the connected electronic device.

The generating unit 153 generates a variety of information. For example, according to the electrical signal that corresponds to an operation and that is received from the operating unit 110, the generating unit 153 generates a customized screen that includes the setting items only for the wireless device 200. Moreover, for example, the generating unit 153 generates the menu screen configuration information regarding the generated customized screen. Furthermore, for example, the generating unit 153 updates the parameters of the setting items included in the generated customized screen.

Figure 4:
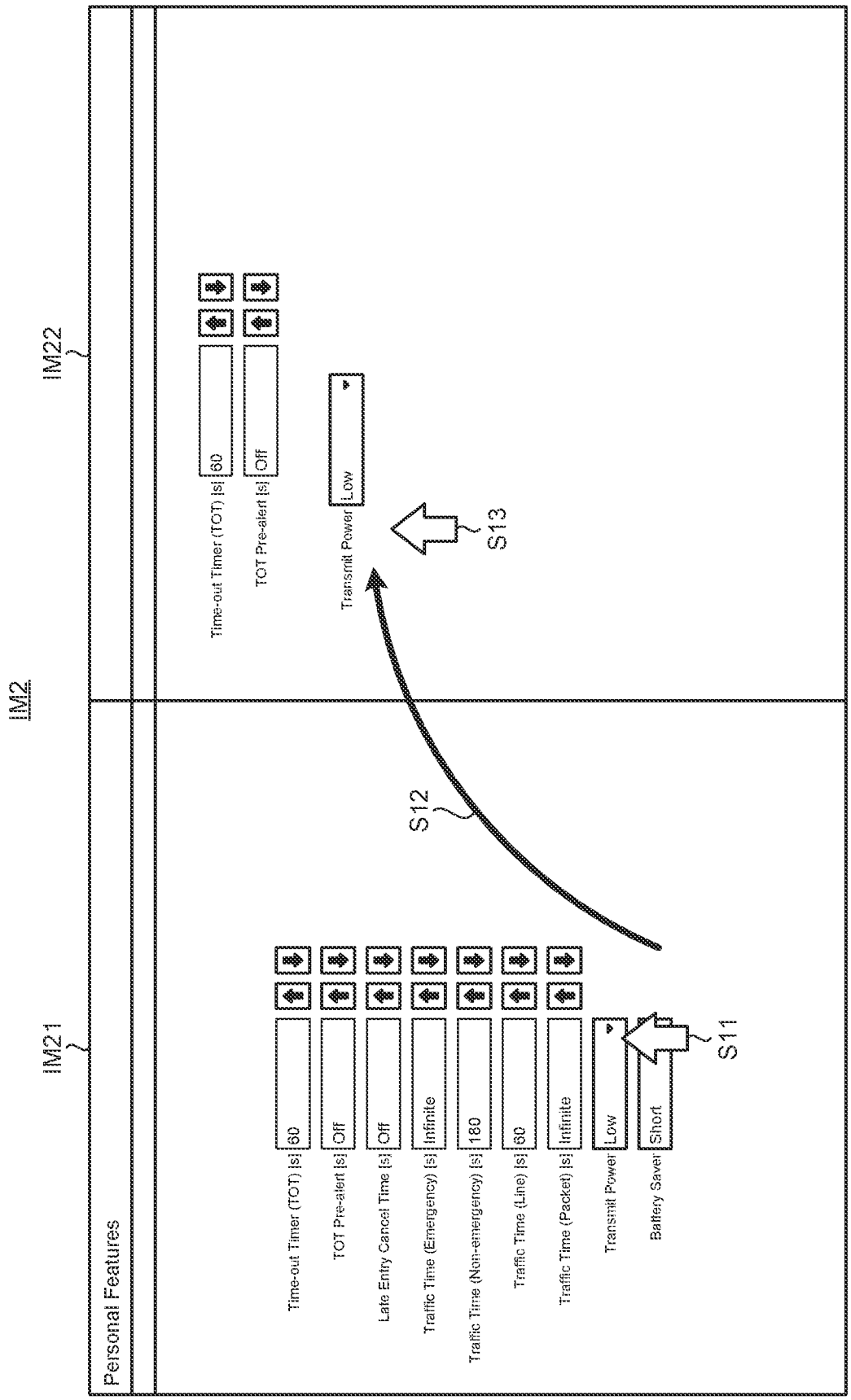
FIG. 4 is a diagram for explaining a method for generating a customized screen.

Explained below with reference to FIG. 4 is a method for generating the customized screen. FIG. 4 is a diagram for explaining a method for generating the customized screen.

With reference to FIG. 4, a display screen IM2 is a screen displayed in the display 120 at a time of generating the customized screen. The display screen IM2 includes a setting screen IM21 and a customized screen IM22. The setting screen IM21 and the customized screen IM22 are displayed, for example, next to each other.

The following explanation is given about a sequence of processes by which a setting item "Transmit Power" displayed in the setting screen IM21 is added to the customized screen IM22 by a drag-and-drop technique, so that a customized menu screen for the connected wireless device 200 is created.

The generating unit 153 selects the setting item "Transmit Power" at which the cursor is pointed according to an operation of the operating unit 110 (Step S11). Then, the generating unit 153 receives a user operation in which the operating unit 110 is operated to drag and move the setting item "Transmit Power" to the customized screen IM22 (Step S12). When the user operates the operating unit 110 to move the cursor and drop the setting item "Transmit Power" in the customized screen IM22, then the generating unit 153 generates the setting item "Transmit Power" in the customized screen IM22 (Step S13). Although explained later in detail, as a result of generating the customized screen IM22, it becomes easier to perform various settings for the wireless device 200.

Returning to the explanation with reference to FIG. 3, the display controller 154 displays a variety of information in the display 120. For example, the display controller 154 displays the display screen IM2, which is illustrated in FIG. 4, in the display 120.

The storage controller 155 stores a variety of information in the storage 140. Moreover, the storage controller 155 stores a variety of information in the wireless device 200. For example, the storage controller 155 stores, in the wireless device 200, the menu screen configuration information regarding the customized screen IM22 illustrated in FIG. 4.

The communication controller 156 controls a variety of communication performed via the communication unit 130. For example, the communication controller 156 controls the communication performed with the wireless device 200.

Figure 5:
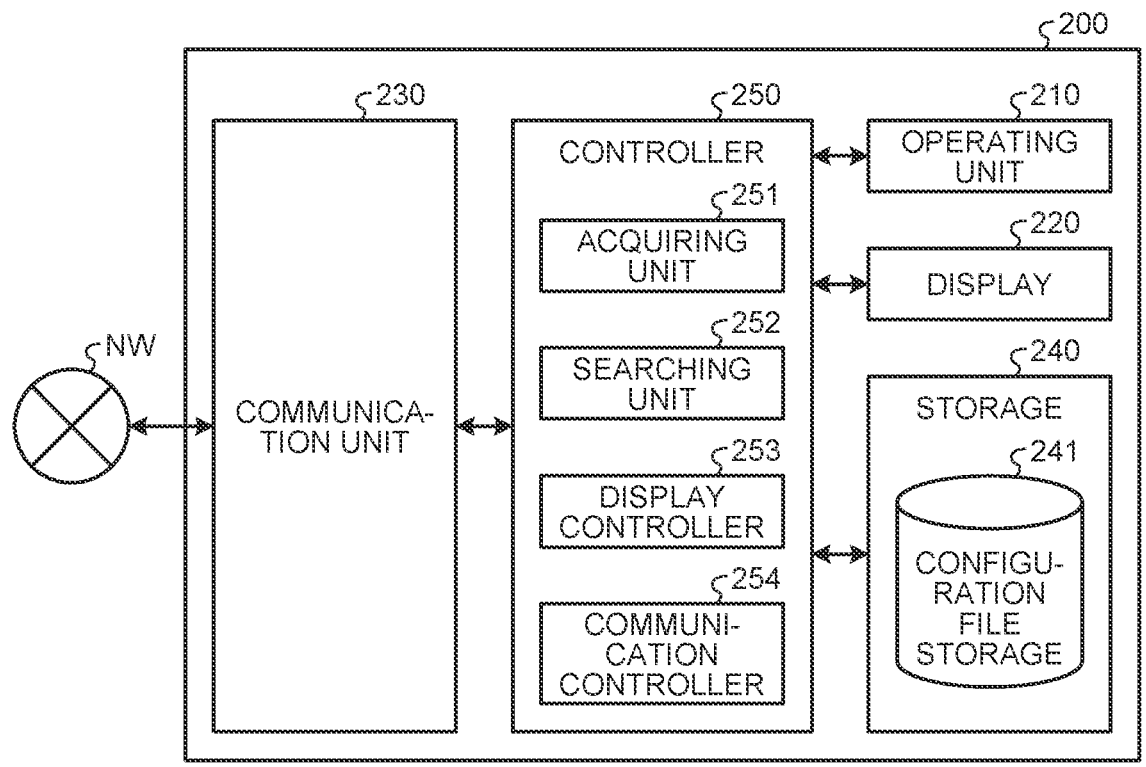
FIG. 5 is a block diagram illustrating an exemplary configuration of a wireless device according to the embodiments of the present application.

Explained below with reference to FIG. 5 is a configuration of the wireless device 200 according to the embodiments of the present application. FIG. 5 is a block diagram illustrating an exemplary configuration of the wireless device 200 according to the embodiments of the present application.

As illustrated in FIG. 5, the wireless device 200 includes an operating unit 210, a display 220, a communication unit 230, a storage 240, and a controller 250. Besides, the wireless device 200 includes devices such as a microphone, a speaker, a wireless transceiver unit, and an antenna. However, an explanation therefor is not given herein.

The operating unit 210 receives various operations from the user. Moreover, for example, the operating unit 110 outputs an electrical signal corresponding to an operation to the controller 250. The operating unit 110 is implemented with, for example, physical buttons or a touch-sensitive panel.

The display 220 displays a variety of information. For example, the display 220 displays a variety of information related to a communication of the radio field intensity. The display 220 is a display such as a liquid crystal display or an organic EL display. If the operating unit 210 is configured by a touch-sensitive panel, then the display 220 is integrated with the operating unit 210.

The communication unit 230 is implemented with, for example, an NIC or a communication circuit. The communication unit 230 is connected to the network NW in a wired manner or in a wireless manner. The communication unit 230 communicates information with other devices via the network NW. For example, the communication unit 230 communicates information with the information processing device 100.

The storage 240 is used to store a variety of information. For example, the storage 240 is implemented with a semiconductor memory device such as a RAM or a flash memory; or with a memory device such as a hard disk or an optical disk. The storage 240 includes a configuration file storage 241.

The configuration file storage 241 is used to store the menu screen configuration information to be used for configuring the customized screen that includes the setting items which are only set in the wireless device 200.

The controller 250 is implemented when, for example, a CPU or an MPU executes a computer program, which is stored in a storage (not illustrated), using a RAM as the work area. Alternatively, the controller 250 can be a controller implemented with an integrated circuit such as an ASIC or an FPGA. The controller 250 includes an acquiring unit 251, a searching unit 252, a display controller 253, and a communication controller 254.

The acquiring unit 251 acquires a variety of information. For example, the acquiring unit 251 acquires a variety of information from an electronic device connected to the wireless device 200. Moreover, for example, the acquiring unit 251 acquires a variety of information from the storage 240. For example, when the menu screen configuration information is stored in the configuration file storage 241, the acquiring unit 251 acquires the menu screen configuration information.

The searching unit 252 searches for a variety of information. For example, the searching unit 252 searches for a variety of information stored in the storage 240. For example, the searching unit 252 searches the configuration file storage 241 for the menu screen configuration information so as to determine whether or not the menu screen configuration information is stored in the configuration file storage 241. Then, for example, the searching unit 252 sends a search result about the menu screen configuration information to the information processing device 100.

The display controller 253 displays a variety of information in the display 220. For example, the display controller 253 displays, in the display 220, a variety of information related to the communication.

The communication controller 254 controls a variety of communication performed via the communication unit 230. For example, the communication controller 254 controls the communication performed with the information processing device 100.

Method for Generating Customized Screen

Figure 6:
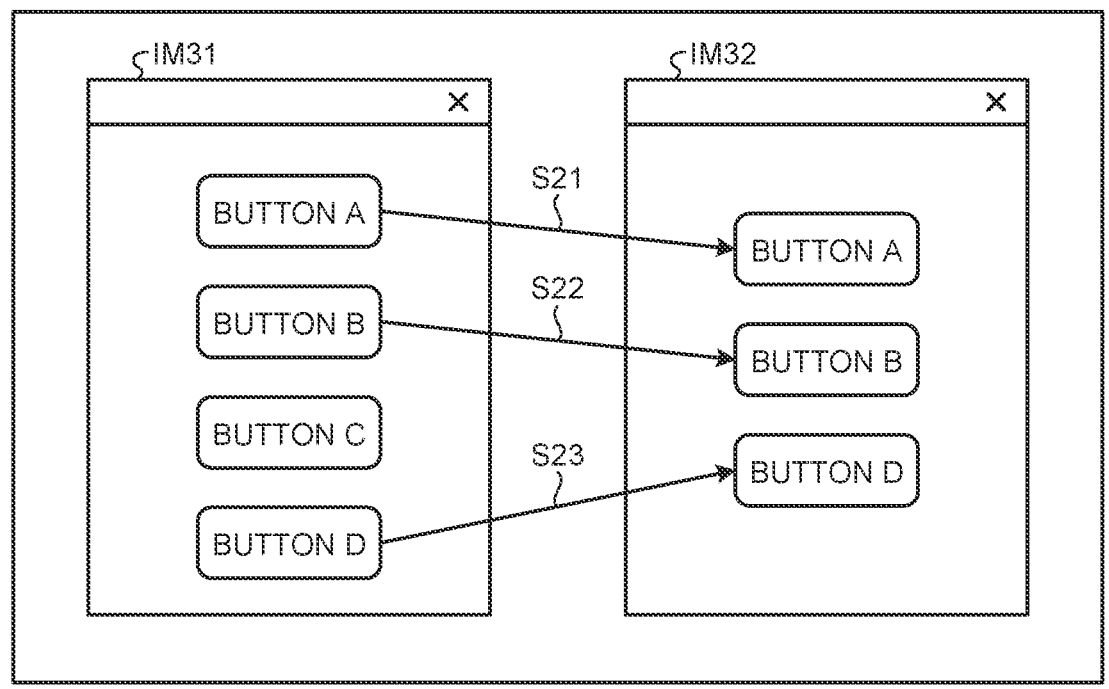
FIG. 6 is a diagram for explaining a method for generating the customized screen according to the embodiments of the present application.

Explained below with reference to FIG. 6 is a method for generating the customized screen. FIG. 6 is a diagram for explaining a method for generating the customized screen according to the embodiments of the present application.

In the following explanation, it is assumed that the information processing device 100 and the wireless device 200 are communicably connected to each other in a wired manner or in a wireless manner via the network NW as illustrated in FIG. 1.

As illustrated in FIG. 6, a GUI screen IM3 includes a default screen IM31 and a customized screen IM32.

In the default screen IM31, all setting items corresponding to the wireless device 200 are included. For ease of explanation, it is assumed that four buttons, namely, buttons A, B, C, and D are provided in the default screen IM31. The buttons A to D are assigned with functions corresponding to various setting items as illustrated in FIG. 4.

The customized screen IM32 includes only the setting items which are selected by the user according to the wireless device 200. For example, the user operates the operating unit 110, which is configured with a mouse, to drag the required buttons from the default screen IM31 and drop them into the customized screen IM32, so that the buttons get placed in the customized screen IM32. More particularly, for example, the user drags the button A from the default screen IM31 and drops it into the customized screen IM32 (Step S21). In that case, the generating unit 153 generates the button A in the customized screen IM32. Similarly, the user drags the button B from the default screen IM31 and drops it into the customized screen IM32 (Step S22). In that case, the generating unit 153 generates the button B in the customized screen IM32. Moreover, the user drags the button D from the default screen IM31 and drops it into the customized screen IM32 (Step S23). In that case, the generating unit 153 generates the button D in the customized screen IM32. As a result, the three buttons, namely, the buttons A, B, and C get placed in the customized screen IM32.

Moreover, according to the wireless device 200, the generating unit 153 can change the values of the parameters of the setting items for the buttons A, B, and D. That is, the generating unit 153 can generate a customized screen in which the setting items as well as the values of the parameters of the setting items are included in accordance with the wireless device 200.

The information processing device 100 can store, in the storage 240 of the wireless device 200, the menu screen configuration information regarding the customized screen IM32 in which the buttons A, B, and D are placed. More particularly, the storage controller 155 stores the menu screen configuration information in the configuration file storage 241 of the storage 240. The menu screen configuration information contains a variety of information such as types of the buttons and coordinates of their display positions in the screen. Accordingly, the information processing device 100 can acquire the menu screen configuration information from the configuration file storage 241 and automatically display the customized screen for the wireless device 200.

Figure 7:
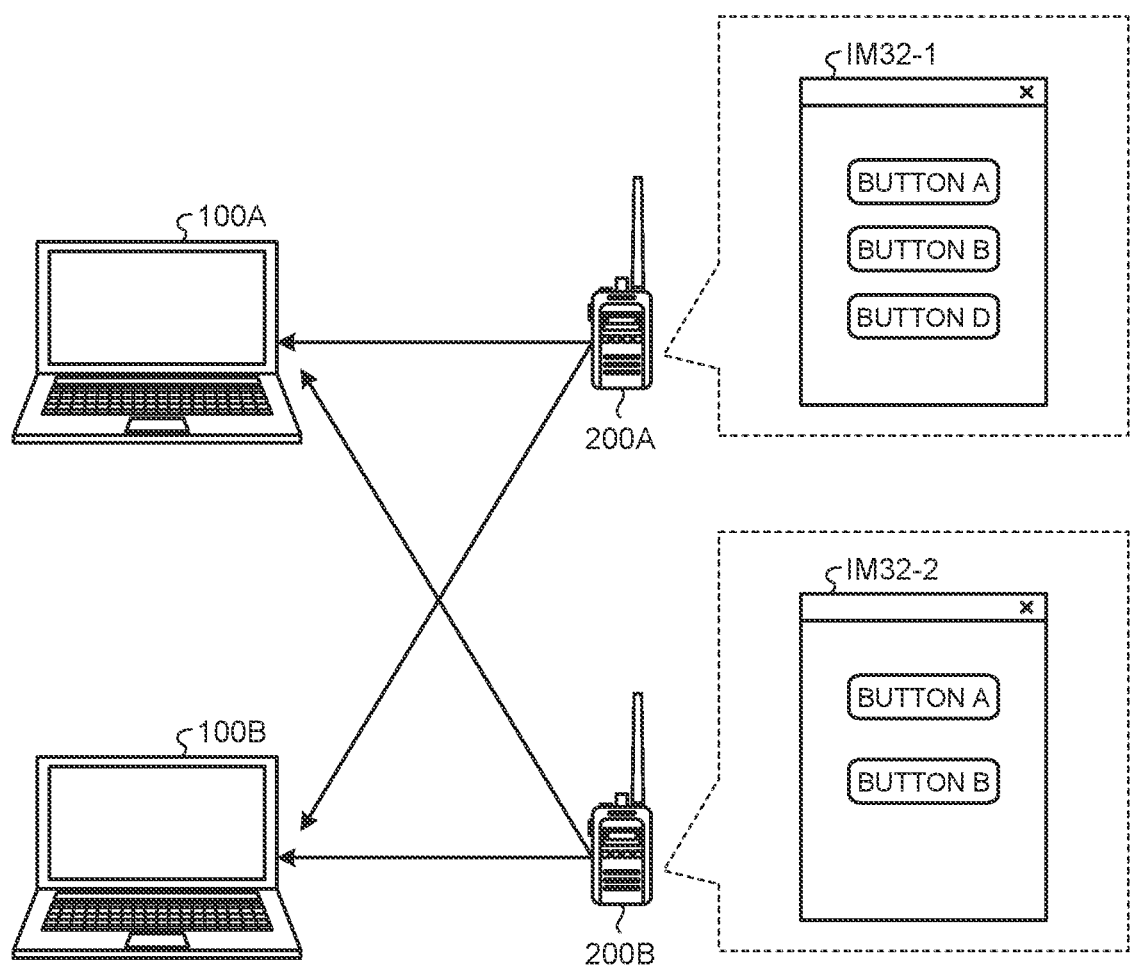
FIG. 7 is a diagram for explaining a method for reading the customized screen stored for the wireless device.

Explained below with reference to FIG. 7 is a method for reading the customized screen stored for each wireless device 200. FIG. 7 is a diagram for explaining a method for reading the customized screen stored for each wireless device 200.

With reference to FIG. 7, information processing devices 100A and 100B and wireless devices 200A and 200B are present. The information processing devices 100A and 100B have an identical configuration to the information processing device 100 illustrated in FIG. 3. The wireless devices 200A and 200B have an identical configuration to the wireless device 200 illustrated in FIG. 5.

The wireless device 200A stores, in the configuration file storage 241 of the storage 240, the menu screen configuration information related to a customized screen IM32-1 in which the buttons A, B, and D are placed. Similarly, the wireless device 200B stores, in the configuration file storage 241 of the storage 240, the menu screen configuration information related to a customized screen IM32-2 in which the buttons A and B are placed.

When the information processing device 100A and the wireless device 200A are connected to each other, the acquiring unit 152 acquires the menu screen configuration information regarding the customized screen IM32-1 from the wireless device 200A. In that case, the display controller 154 displays the customized screen IM32-1 in the display 120. Moreover, after the connection with the wireless device 200A is terminated, if the information processing device 100A and the wireless device 200B are connected to each other, then the acquiring unit 152 acquires the menu screen configuration information regarding the customized screen IM32-2 from the wireless device 200B. In that case, the display controller 154 displays the customized screen IM32-2 in the display 120. Meanwhile, the information processing device 100B too can perform identical processes to the information processing device 100A.

In the present application, since the wireless devices 200A and 200B store the menu screen configuration information therefor respectively, the information processing devices 100A and 100B become able to display the customized screens for the wireless devices 200A and 200B. In other words, in the present application, since the wireless devices stores the menu screen configuration information therefor, regardless of the information processing device connected to the wireless device or regardless of the wireless device connected to the information processing device, the customized screen set in the wireless device can be displayed.

First Embodiment

Figure 8:
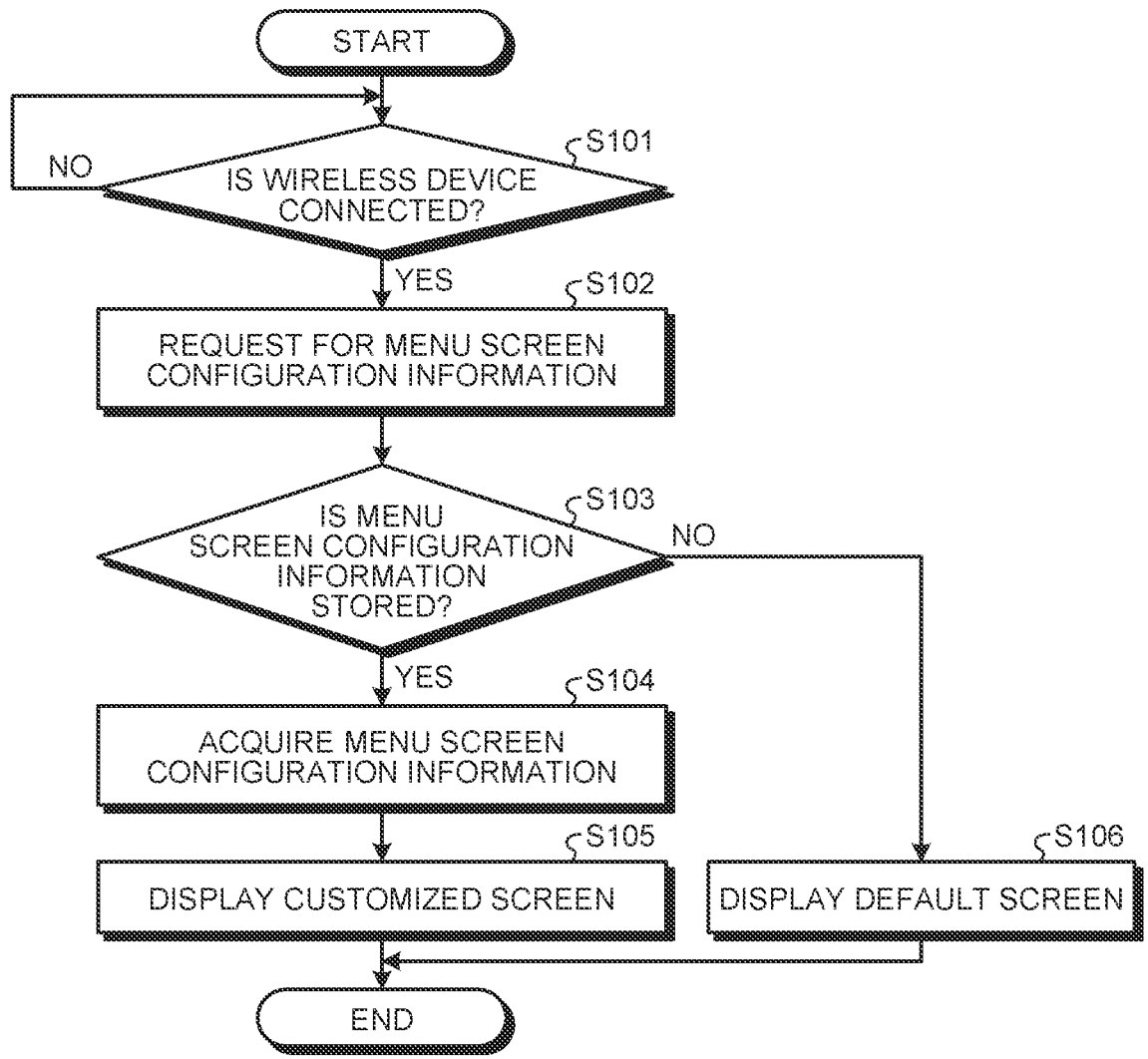
FIG. 8 is a flowchart for explaining an exemplary flow of processes performed by a controller of the information processing device according to a first embodiment of the application.

Explained below with reference to FIG. 8 is a flow of processes performed in the information processing device according to a first embodiment of the present application. FIG. 8 is a flowchart for explaining an exemplary flow of processes performed by the controller of the information processing device according to the first embodiment of the present application.

The controller 150 determines whether or not the wireless device 200 is connected to the information processing device 100 (Step S101). More particularly, the determining unit 151 determines whether or not the wireless device 200 is connected to the information processing device 100 in a wired manner or in a wireless manner via the network NW. If it is determined that the wireless device 200 is not connected (No at Step S101), then the controller 150 again performs the process at Step S101. When it is determined that the wireless device 200 is connected (Yes at Step S101), the system control proceeds to Step S102.

When it is determined that the wireless device 200 is connected (Yes at Step S101), the controller 150 requests the wireless device 200 for the menu screen configuration information (Step S102). More particularly, the acquiring unit 152 requests the wireless device 200 for the menu screen configuration information. Then, the system control proceeds to Step S103.

The controller 150 determines whether or not the menu screen configuration information is stored in the wireless device 200 (Step S103). More particularly, based on the search result received from the wireless device 200 regarding the menu screen configuration information, the controller 150 determines whether or not the menu screen configuration information is stored in the wireless device 200. If it is determined that the menu screen configuration information is stored (Yes at Step S103), then the system control proceeds to Step S104. On the other hand, if it is determined that the menu screen configuration information is not stored (No at Step S103), then the system control proceeds to Step S106.

When it is determined that the menu screen configuration information is stored (Yes at Step S103), the controller 150 acquires the menu screen configuration information from the wireless device 200 (Step S104). More particularly, the acquiring unit 152 acquires the menu screen configuration information stored in the configuration file storage 241. Then, the system control proceeds to Step S105.

The controller 150 displays the customized screen of the wireless device 200 (Step S105). More particularly, based on the menu screen configuration information obtained by the acquiring unit 152, the display controller 154 displays the customized screen in the display 120. Then the processes illustrated in FIG. 8 end.

Meanwhile, when it is determined that the menu screen configuration information is not stored (No at Step S103), the controller 150 displays a default screen (Step S106). More particularly, the display controller 154 displays the default screen in the display 120.

As explained above, according to the first embodiment, since the menu screen configuration information is stored in the wireless devices, regardless of the information processing device (computer) that is connected or regardless of the wireless device that is connected, the customized screen suitable for each of the wireless devices can be automatically configured.

Moreover, according to the first embodiment, since the customized screen including only the required items for the wireless device can be displayed, it becomes easier to find the buttons for changing the settings. That enables to improve operability.

Second Embodiment

Figure 9:
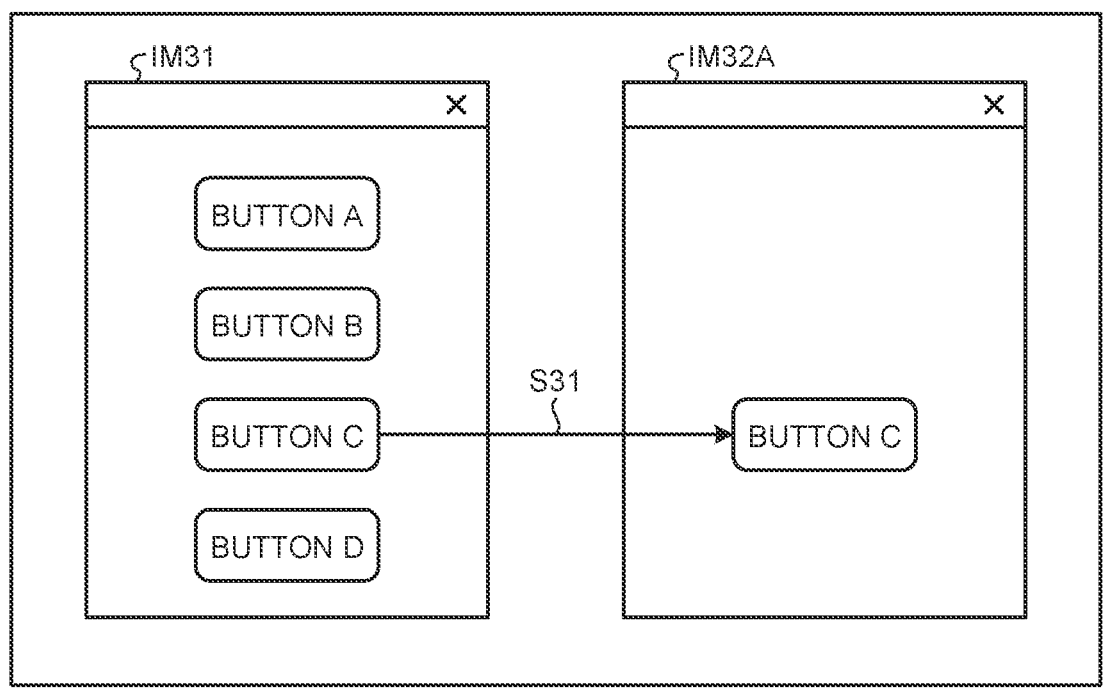
FIG. 9 is a diagram for explaining the processes performed in the information processing system according to a second embodiment of the present application.

Explained below with reference to FIG. 9 are the processes performed in the information processing system according to a second embodiment of the present application. FIG. 9 is a diagram for explaining the processes performed in the information processing system 1 according to the second embodiment of the present application.

According to the second embodiment, in the information processing system 1, the setting items that are included in the customized screen set in the wireless device 200 are changed. More particularly, in the information processing system 1, in a case of adding a setting item to or deleting a setting item from the customized screen set in the wireless device 200 from among multiple selectable setting items present in the default screen IM31, the setting item selected in advance as an advance setting item is displayed in the customized screen IM32, and then the menu screen configuration information of the wireless device 200 is acquired. The following explanation is given about a case in which the button C represents the setting item to be changed.

As illustrated in FIG. 9, a GUI screen IMSA includes the default screen IM31 and a customized screen IM32A.

For example, the user drags the button C, which represents the setting item to be changed (also called the item for change), from the default screen IM31 and drops it into the customized screen IM32A (Step S31). In that case, the generating unit 153 generates the button C in the customized screen IM32A.

Figure 10A:
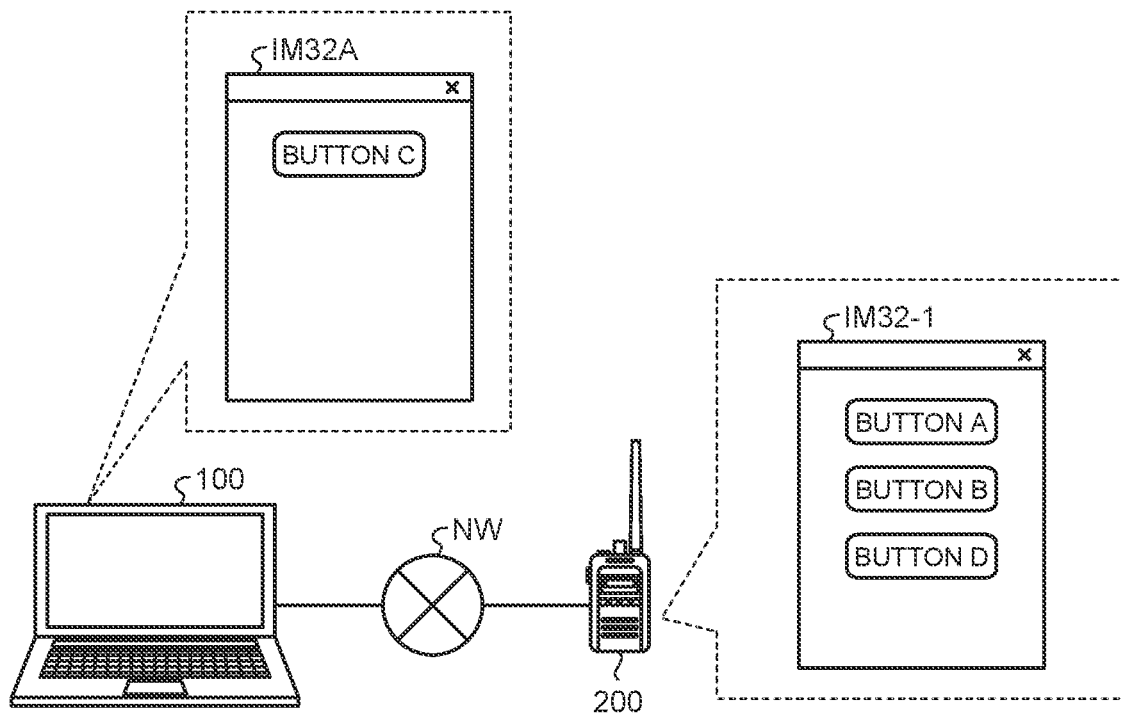
FIG. 10A is a diagram for explaining a method for adding a setting item in the customized screen.
Figure 10B:
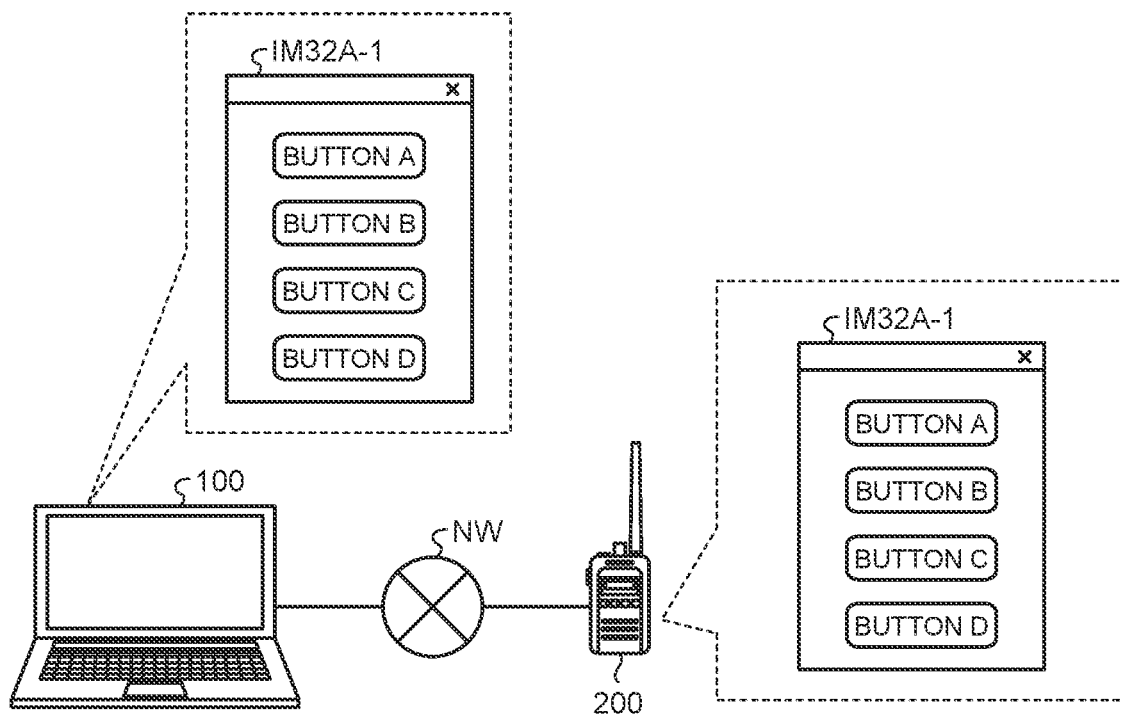
FIG. 10B is a diagram for explaining a method for adding a setting item in the customized screen.
Figure 10C:
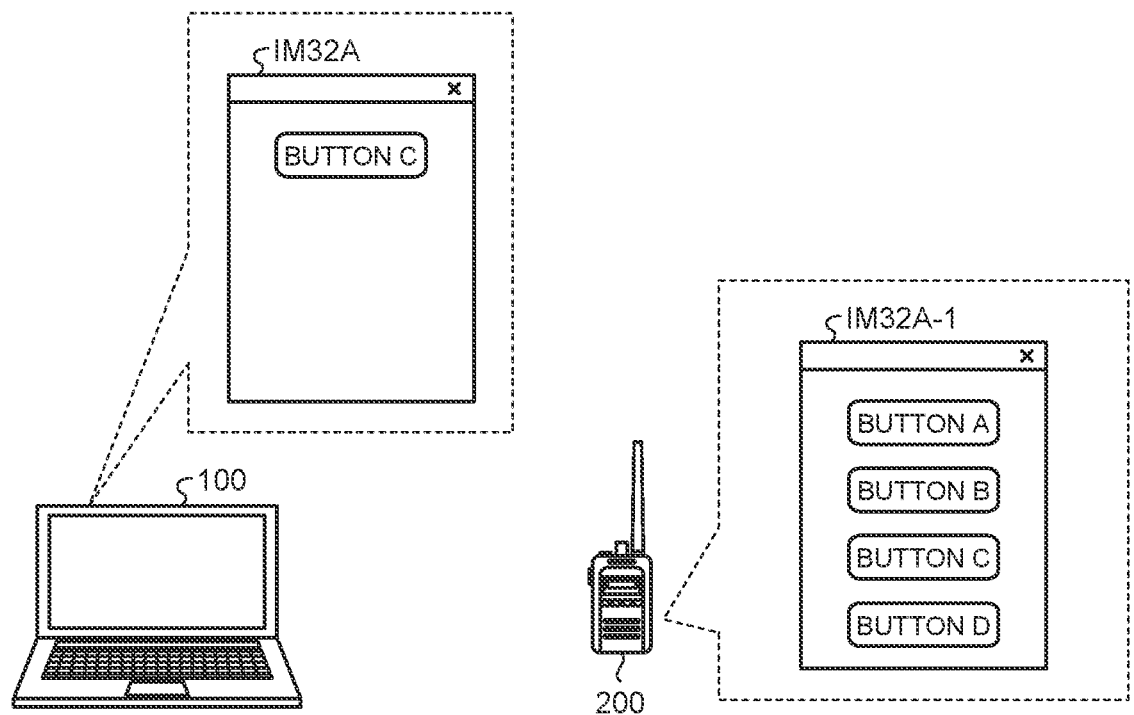
FIG. 10C is a diagram for explaining a method for adding a setting item in the customized screen.

Explained below with reference to FIGS. 10A, 10B, and 10C is a method for adding a setting item in the customized screen. FIGS. 10A, 10B, and 10C are diagrams for explaining a method for adding a setting item in the customized screen.

With reference to FIG. 10A, the information processing device 100 and the wireless device 200 are illustrated. In the information processing device 100, only the button C is displayed in the customized screen IM32A. The wireless device 200 stores therein the menu screen configuration information regarding the customized screen IM32-1 that includes the buttons A, B, and D.

In the case of adding the button C to the customized screen IM32-1, while keeping the customized screen IM32A including the button C displayed in the information processing device 100, a connection is established between the information processing device 100 and the wireless device 200 via the network NW. As a result, the acquiring unit 152 of the information processing device 100 acquires the menu screen configuration information regarding the customized screen IM32-1 from the wireless device 200.

Then, as illustrated in FIG. 10B, based on the menu screen configuration information regarding the customized screen IM32-1 acquired by the acquiring unit 152, the generating unit 153 generates a customized screen IM32A-1. More particularly, the generating unit 153 adds the button C to the customized screen IM32-1 and generates the customized screen IM32A-1. In other words, the generating unit 153 updates the customized screen IM32-1. Then, the storage controller 155 stores, in the wireless device 200, the menu screen configuration information regarding the customized screen IM32A-1.

Subsequently, as illustrated in FIG. 10C, when the connection between the information processing device 100 and the wireless device 200 is terminated, the customized screen IM32A including only the button C is displayed in the information processing device 100. In that state, when the wireless device 200B illustrated in FIG. 7 is connected to the information processing device 100 illustrated in FIG. 10C, the button C is added to the customized screen IM32-2. Thereafter, when a wireless device for which the button C is to be added in the customized screen is connected to the information processing device 100, the button C can be added to the customized screen as illustrated in FIGS. 10A to 10C.

Meanwhile, with reference to FIGS. 10A to 10C, if the button C is already included in the customized screen corresponding to the menu screen configuration information obtained from the wireless device 200, then the information processing device 100 does not update the customized screen.

Moreover, with reference to FIGS. 10A to 10C, although the explanation is given about adding a setting item, the present application is not limited to that case. Alternatively, for example, in the state in which a screen for changing the parameters for the wireless device 200 is displayed in the information processing device 100, when the wireless device 200 is connected, the information processing device 100 can update the values of the parameters. More particularly, based on the menu screen configuration information regarding the customized screen IM32-1 acquired by the acquiring unit 152, the generating unit 153 can change the parameters of the setting items.

Figure 11:
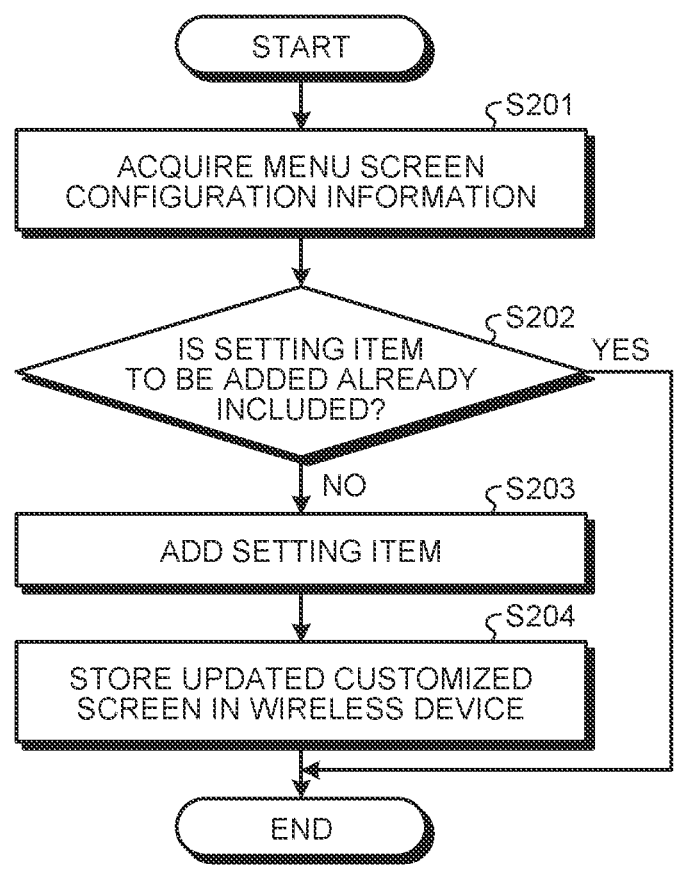
FIG. 11 is a flowchart for explaining an exemplary flow of processes performed by the controller of the information processing device for adding a setting item in the customized screen.

Explained below with reference to FIG. 11 is a flow of processes performed by the controller of the information processing device for adding a setting item in the customized screen. FIG. 11 is a flowchart for explaining an exemplary flow of processes performed by the controller of the information processing device for adding a setting item in the customized screen.

Firstly, the controller 150 acquires the menu screen configuration information regarding the customized screen from the wireless device 200 that is connected to the information processing device 100 (Step S201). More particularly, the acquiring unit 152 acquires the menu screen configuration information from the wireless device 200. Then, the system control proceeds to Step S202.

The controller 150 determines whether or not the setting item to be added to the customized screen is already included (Step S202). More particularly, the generating unit 153 determines whether or not the setting item to be added to the customized screen is already included. If it is determined that the setting item to be added is already included (Yes at Step S202), the processes illustrated in FIG. 11 end. However, if it is determined that the setting item to be added is not included (No at Step S202), then the system control proceeds to Step S203.

If it is determined that the setting item to be added is not included (No at Step S202), then the controller 150 adds that setting item to the customized screen (Step S203). More particularly, the generating unit 153 adds, in the customized screen, the setting item to be added and thus updates the customized screen. Then, the system control proceeds to Step S204.

The controller 150 stores, in the wireless device 200, the menu screen configuration information regarding the updated customized screen (Step S204). More particularly, the storage controller 155 stores the menu screen configuration information in the configuration file storage 241 of the storage 240 in the wireless device 200. Then the processes illustrated in FIG. 11 end.

Figure 12A:
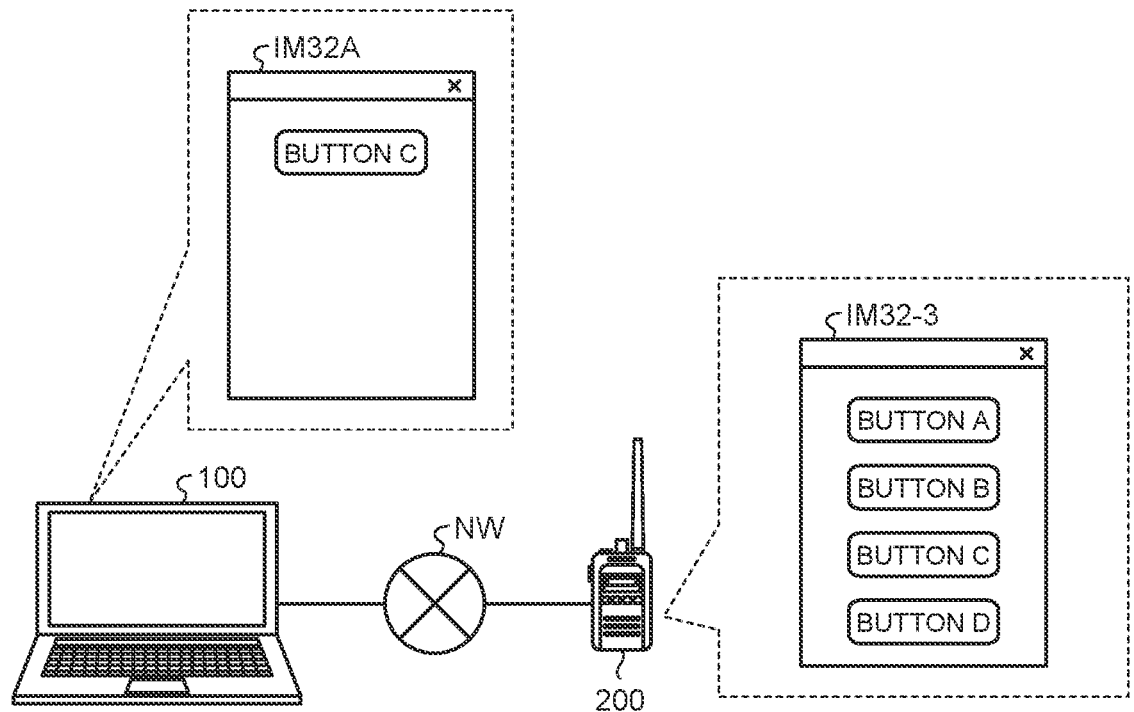
FIG. 12A is a diagram for explaining a method for deleting a setting item from the customized screen.
Figure 12B:
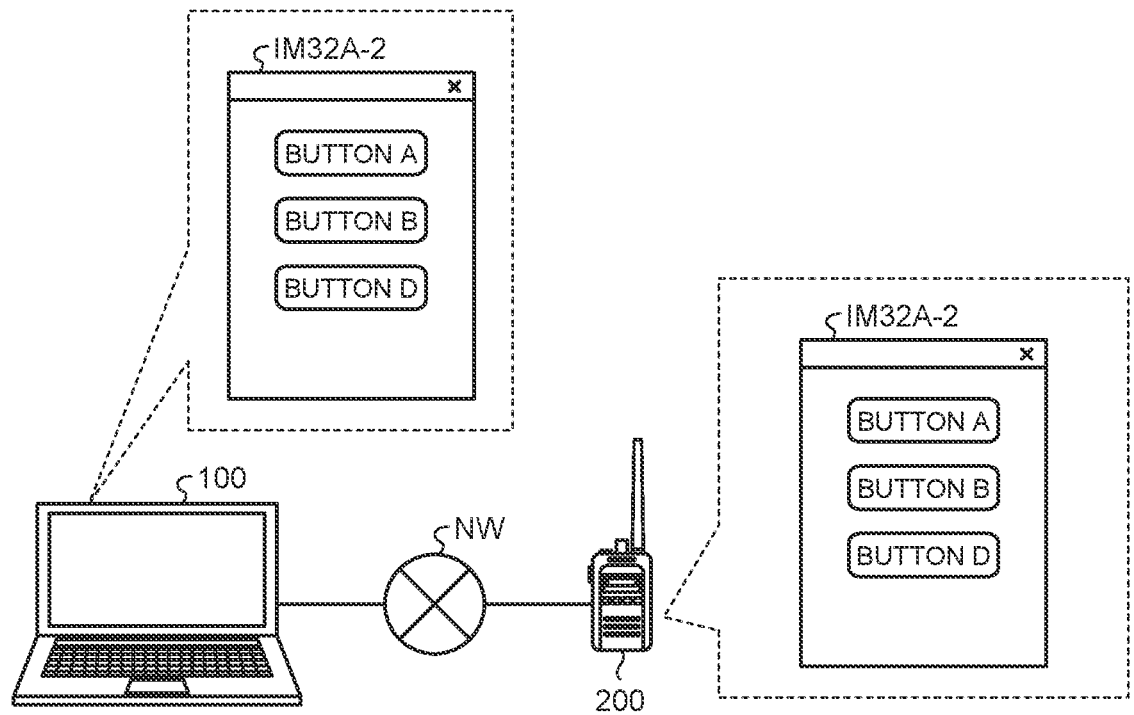
FIG. 12B is a diagram for explaining a method for deleting a setting item from the customized screen.
Figure 12C:
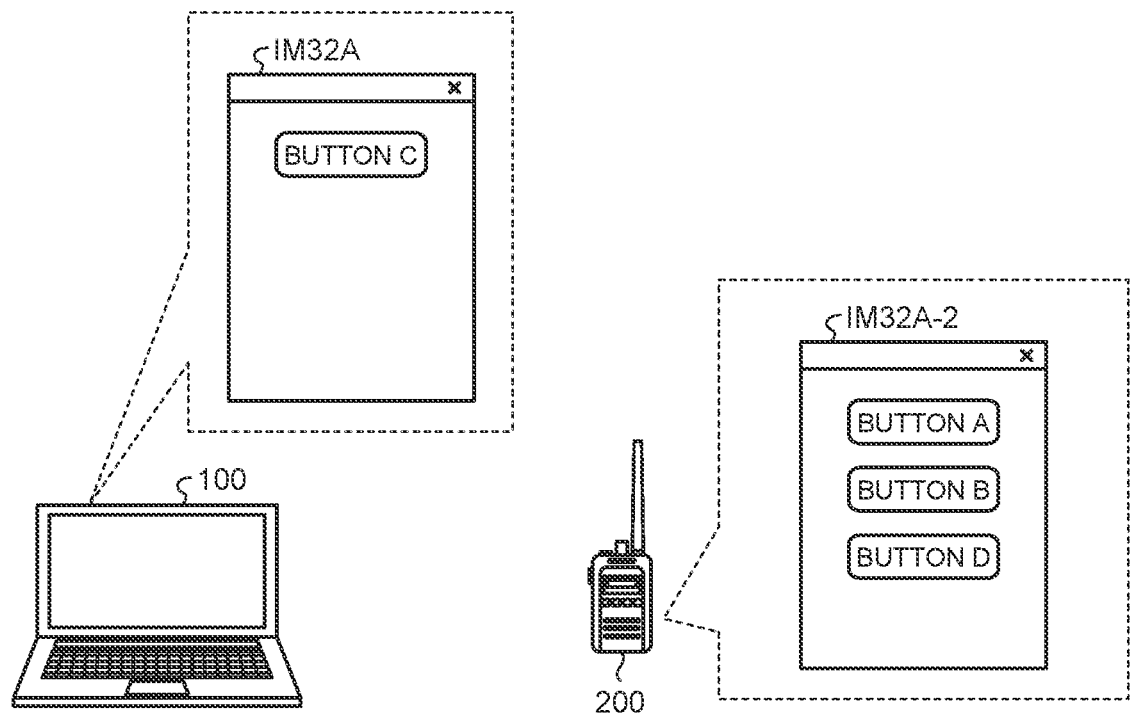
FIG. 12C is a diagram for explaining a method for deleting a setting item from the customized screen.

Explained below with reference to FIGS. 12A, 12B, and 12C is a method for deleting a setting item from the customized screen. FIGS. 12A, 12B, and 12C are diagrams for explaining a method for deleting a setting item from the customized screen.

In FIG. 12A, the information processing device 100 and the wireless device 200 are illustrated. In the information processing device 100, only the button C is displayed in the customized screen IM32A. The wireless device 200 stores therein the menu screen configuration information regarding a customized screen IM32-3 that includes the buttons A, B, C, and D.

In the case of deleting the button C from the customized screen IM32-3, while keeping the customized screen IM32A including the button C displayed in the information processing device 100, a connection is established between the information processing device 100 and the wireless device 200 via the network NW. As a result, the acquiring unit 152 of the information processing device 100 acquires the menu screen configuration information regarding the customized screen IM32-3 from the wireless device 200.

Then, as illustrated in FIG. 12B, based on the menu screen configuration information regarding the customized screen IM32-3 acquired by the acquiring unit 152, the generating unit 153 generates a customized screen IM32A-2. More particularly, the generating unit 153 deletes the button C from the customized screen IM32-3 and generates the customized screen IM32A-2. In other words, the generating unit 153 updates the customized screen IM32-3. Then, the storage controller 155 stores, in the wireless device 200, the menu screen configuration information regarding the customized screen IM32A-2.

Subsequently, as illustrated in FIG. 12C, when the connection between the information processing device 100 and the wireless device 200 is terminated, the customized screen IM32A including only the button C is displayed in the information processing device 100. Herein, in an identical manner to the case of adding a setting item, when a wireless device in which the menu screen configuration information regarding the customized screen including the button C is stored is connected to the information processing device illustrated in FIG. 12C, the button C can be deleted from the customized screen.

Meanwhile, with reference to FIGS. 12A to 12C, if the button C is not included in the customized screen corresponding to the menu screen configuration information acquired from the wireless device 200, then the information processing device 100 does not update the customized screen.

Explained with reference to FIG. 13 is a flow of processes performed by the controller of the information processing device for deleting a setting item from the customized screen. FIG. 13 is a flowchart for explaining an exemplary flow of processes performed by the controller of the information processing device for deleting a setting item from the customized screen.

The operations at Steps S301 and S304 are identical to the operations at Steps S201 and S204, respectively, illustrated in FIG. 11. Hence, that explanation is not given again.

The controller 150 determines whether or not the setting item to be deleted from the customized screen is included (Step S302). More particularly, the generating unit 153 determines whether or not the setting item to be deleted from the customized screen is included. If it is determined that the setting item to be deleted is not included (No at Step S302), then the processes illustrated in FIG. 13 end. On the other hand, if it is determined that the setting item to be deleted is included (Yes at Step S302), then the system control proceeds to Step S303.

If it is determined the setting item to be deleted is included (Yes at Step S302), then the controller 150 deletes, from the customized screen, the setting item to be deleted (Step S303). More particularly, the generating unit 153 deletes, from the customized screen, the setting item to be deleted and thus updates the customized screen. Then, the system control proceeds to Step S304.

Meanwhile, in the embodiments, after a button has been added to the customized screen or after a button has been deleted from the customized screen, an arrangement of the buttons can be decided without any particular restriction. For example, the buttons in the customized screen can be positioned according to a predetermined priority order. Alternatively, when the buttons are added, they can be positioned according to the order of being added. Moreover, after a button has been added to the customized screen or after a button has been deleted from the customized screen, the user can be allowed to operate the operating unit 110 and adjust the positions of the buttons in the customized screen.

Meanwhile, in the embodiments, although the explanation is given about adding a button to the customized screen and deleting a button from the customized screen, the present application is not limited to those cases. Alternatively, for example, the present application is also applicable to a case of customizing various GUI elements such as text boxes, pulldown menus, check boxes, and radio buttons.

As explained above, according to the embodiments, it is easy to add a button to or delete a button from a customized screen that includes the setting items for the wireless device 200. Hence, according to the embodiments, it is easy to create an appropriate customized screen that includes the setting items for the wireless device 200.

According to the present application, it becomes possible to easily configure an appropriate customized screen.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
   a display configured to simultaneously display a default screen which includes all of setting items to be set for an electronic device connected thereto and a customized screen which includes at least one of the setting items for setting the connected electronic device;
   a memory that is configured to store computer executable instructions; and
   a processor that is configured to execute the computer executable instructions to perform operations, comprising:
      selecting at least one of the setting items from the default screen displayed in the display to thereby display, on the customized screen, wherein the at least one of the setting items selected was predetermined;
      determining whether or not the electronic device is connected thereto;
      acquiring, when the determining determines that the electronic device is connected, from the connected electronic device, a menu screen configuration information which is stored in the electronic device and which includes the setting items predetermined;
      changing the menu screen configuration information based on the selected setting items being predetermined; and
      storing the menu screen configuration information, which has been changed by the changing, in the connected electronic device, wherein
      at the changing, when the electronic device is connected in a state in which the selected setting items that were predetermined are displayed on the customized screen, comparing the setting items included in the menu screen configuration information acquired with the setting items predetermined to thereby add or delete the setting items predetermined to or from the menu screen configuration information every time when the electronic device is connected.

2. The information processing device according to claim 1, wherein, when the determining determines that the electronic device is connected and if the menu screen configuration information is not acquired, a new menu screen configuration information is generated by the changing based on the setting items selected according to the connected electronic device from among the multiple selectable setting items.

3. The information processing device according to claim 1 further comprising, configuring a menu screen based on the menu screen configuration information and setting the menu screen in the connected electronic device.

4. An information processing method comprising:
   displaying, in a display, a default screen which includes all of setting items to be set for an electronic device connected thereto and a customized screen which includes at least one of the setting items for setting the connected electronic device simultaneously;
   selecting at least one of the setting items from the default screen displayed in the display to thereby display, on the customized screen, the at least one of the setting items selected as setting items predetermined;
   determining whether or not the electronic device is connected thereto;
   acquiring, when the determining determines that the electronic device is connected, from the electronic device, a menu screen configuration information which is stored in the electronic device and which includes the setting items predetermined;

changing the menu screen configuration information based on the setting items predetermined selected by the selecting; and storing the changed menu screen configuration information in the connected electronic device, wherein at the changing, when the electronic device is connected in a state in which the setting items predetermined selected by the selecting on the customized screen, comparing the setting items included in the menu screen configuration information acquired with the setting items predetermined to thereby add or delete the setting items predetermined to or from the menu screen configuration information every time when the electronic device is connected.

5. A non-transitory storage medium that stores a computer program that causes a computer to execute:

displaying, in a display, a default screen which includes all of setting items to be set for an electronic device connected thereto and a customized screen which includes at least one of the setting items for setting the connected electronic device simultaneously;

selecting at least one of the setting items from the default screen displayed in the display to thereby display, on the customized screen, the at least one of the setting items selected as setting items predetermined;

determining whether or not the electronic device is connected thereto;

acquiring, when the determining determines that the electronic device is connected, from the electronic device, a menu screen configuration information which is stored in the electronic device and which includes the setting items predetermined;

changing the menu screen configuration information based on the setting items predetermined selected by the selecting; and storing the changed menu screen configuration information in the connected electronic device, wherein at the changing, when the electronic device is connected in a state in which the setting items predetermined selected by the selecting on the customized screen, comparing the setting items included in the menu screen configuration information acquired with the setting items predetermined to thereby add or delete the setting items predetermined to or from the menu screen configuration information every time when the electronic device is connected.

* * * * *